(12) United States Patent
Burch et al.

(10) Patent No.: US 9,787,659 B2
(45) Date of Patent: *Oct. 10, 2017

(54) TECHNIQUES FOR SECURE ACCESS MANAGEMENT IN VIRTUAL ENVIRONMENTS

(71) Applicant: Micro Focus Software Inc., Provo, UT (US)

(72) Inventors: Lloyd Leon Burch, Payson, UT (US); Prakash Umasankar Mukkara, Bangalore (IN); Douglas Garry Earl, Orem, UT (US)

(73) Assignee: Micro Focus Software Inc., Provo, UT (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/658,349

(22) Filed: Mar. 16, 2015

(65) Prior Publication Data

US 2015/0200928 A1 Jul. 16, 2015

Related U.S. Application Data

(63) Continuation of application No. 12/714,452, filed on Feb. 27, 2010, now Pat. No. 8,984,621.

(51) Int. Cl.
*H04L 29/06* (2006.01)
*G06F 9/455* (2006.01)
(Continued)

(52) U.S. Cl.
CPC ............ *H04L 63/08* (2013.01); *G06F 9/455* (2013.01); *G06F 9/45533* (2013.01);
(Continued)

(58) Field of Classification Search
CPC ...... G06F 9/45533; G06F 21/33; G06F 21/53; G06F 2221/2149; G06F 9/455;
(Continued)

(56) References Cited

U.S. PATENT DOCUMENTS 6,041,357 A 3/2000 Kunzelman et al.
7,188,180 B2 3/2007 Larson et al.
(Continued)

OTHER PUBLICATIONS

Deng et al., "A Communication Virtual Machine", Retrieved from https://pdfs.semanticscholar.org/99ec/cf849da23de03a02e31399c860d2e37e3cf5.pdf, Published Mar. 4, 2006.*

(Continued)

*Primary Examiner* — Chau Le
(74) *Attorney, Agent, or Firm* — Schwegman Lundberg & Woessner, P.A.

(57) ABSTRACT

Techniques for secure access management to virtual environments are provided. A user authenticates to a portal for purposes of establishing a virtual machine (VM). The portal interacts with a cloud server and an identity server to authenticate the user, to acquire an Internet Protocol (IP) address and port number for the VM, and to obtain a secure token. The user then interacts with a secure socket layer virtual private network (SSL VPN) server to establish a SSL VPN session with the VM. The SSL VPN server also authenticates the token through the identity server and acquires dynamic policies to enforce during the SSL VPN session between the user and the VM (the VM managed by the cloud server).

17 Claims, 4 Drawing Sheets

(51) Int. Cl.
*G06F 21/33* (2013.01)
*G06F 21/53* (2013.01)
*H04L 29/08* (2006.01)

(52) U.S. Cl.
CPC .............. *G06F 21/33* (2013.01); *G06F 21/53* (2013.01); *H04L 63/0272* (2013.01); *H04L 63/10* (2013.01); *H04L 67/10* (2013.01); *G06F 2221/2149* (2013.01)

(58) Field of Classification Search
CPC ..... H04L 63/08; H04L 63/0272; H04L 63/10; H04L 67/10
See application file for complete search history.

(56) References Cited

U.S. PATENT DOCUMENTS

| | | | |
|---|---|---|---|
| 7,305,549 B2* | 12/2007 | Hunt | H04L 9/3273 713/154 |
| 7,389,399 B2 | 6/2008 | Terrell et al. | |
| 7,478,427 B2 | 1/2009 | Mukherjee et al. | |
| 7,508,310 B1 | 3/2009 | Light et al. | |
| 7,609,167 B1 | 10/2009 | Light et al. | |
| 7,861,081 B2 | 12/2010 | Yeap et al. | |
| 7,961,722 B1 | 6/2011 | Jankowski | |
| 8,904,509 B2* | 12/2014 | Barbour | G06F 21/40 726/7 |
| 8,984,621 B2 | 3/2015 | Burch et al. | |
| 2002/0143865 A1 | 10/2002 | Tung Loo et al. | |
| 2004/0225895 A1 | 11/2004 | Mukherjee et al. | |
| 2007/0179955 A1* | 8/2007 | Croft | G06F 3/1415 |
| 2008/0244579 A1 | 10/2008 | Muller | |
| 2008/0263629 A1 | 10/2008 | Anderson | |
| 2009/0282472 A1 | 11/2009 | Hamilton, II et al. | |
| 2010/0008220 A1 | 1/2010 | Le Roux | |
| 2010/0131948 A1* | 5/2010 | Ferris | G06F 9/50 718/1 |
| 2010/0257269 A1 | 10/2010 | Clark | |
| 2011/0214176 A1 | 9/2011 | Burch et al. | |
| 2011/0231670 A1* | 9/2011 | Shevchenko | H04L 63/0815 713/189 |
| 2012/0109829 A1* | 5/2012 | McNeal | G06Q 20/3674 705/67 |
| 2012/0147894 A1 | 6/2012 | Mulligan et al. | |
| 2013/0047215 A1* | 2/2013 | Radhakrishnan | G06F 21/10 726/4 |
| 2013/0125011 A1* | 5/2013 | Hwang | G06Q 10/10 715/745 |
| 2013/0227137 A1* | 8/2013 | Damola | G06F 9/5072 709/224 |

OTHER PUBLICATIONS

Paul Krzyzanowski, "Cryptographic Communication and AUthentication", Retrieved from https://www.cs.rutgers.edu/~pxk/rutgers/notes/content/13-crypto.pdf, Published 1997.*
Cisco, "Overview of TrustSec", Retrieved From http://www.cisco.com/c/dam/en/us/solutions/collateral/borderless-networks/trustsec/C07-730151-00_overview_of_trustSec_og.pdf, Published Jan. 2014.*
"U.S. Appl. No. 12/714,452, Advisory Action dated Apr. 10, 2014", 2 pgs.
"U.S. Appl. No. 12/714,452, Advisory Action dated May 23, 2013", 3 pgs.
"U.S. Appl. No. 12/714,452, Final Office Action dated Jan. 31, 2014", 33 pgs.
"U.S. Appl. No. 12/714,452, Final Office Action dated Feb. 20, 2013", 33 pgs.
"U.S. Appl. No. 12/714,452, Non Final Office Action dated Jul. 9, 2013", 35 pgs.
"U.S. Appl. No. 12/714,452, Non Final Office Action dated Jul. 25, 2014", 35 pgs
"U.S. Appl. No. 12/714,452, Non Final Office Action dated Aug. 3, 2012", 27 pgs.
"U.S. Appl. No. 12/714,452, Notice of Allowance dated Nov. 10, 2014", 8 pgs.
"U.S. Appl. No. 12/714,452, filed Mar. 31, 2014 to Final Office Action dated Jan. 31, 2014", 10 pgs.
"U.S. Appl. No. 12/714,452, filed Apr. 22, 2013 to Final Office Action dated Feb. 20, 2013", 9 pgs.
"U.S. Appl. No. 12/714,452, filed Oct. 9, 2013 to Non Final Office Action dated Jul. 9, 2013", 9 pgs.
"U.S. Appl. No. 12/714,452, filed Oct. 27, 2014 to Non Final Office Action dated Jul. 25, 2014", 10 pgs.
"U.S. Appl. No. 12/714,452, filed Nov. 5, 2012 to Non Final Office dated Aug. 3, 2012", 8 pgs.
"VMWare™ Communities Discussion from Jul. 14, 2009 to Jul. 16, 2009", http://communities.vmware.com/thread/220933, 2 pgs.
Curphey, et al., "A Guide to Building Secure Web Applications", CGI Security white paper, (2002), 17 pgs.
Frankel, et al., "Guide to SSL VPNs", NIST, (Jul. 2008), 87 pgs.

* cited by examiner

TECHNIQUES FOR SECURE ACCESS MANAGEMENT IN VIRTUAL ENVIRONMENTS

This application is a continuation of U.S. patent application Ser. No. 12/714,452, filed Feb. 27, 2010, now issued as U.S. Pat. No. 8,984,621, which is incorporated by reference herein in its entirety.

BACKGROUND

Increasingly, services and communication are achieved over the Internet and the World-Wide Web (WWW). Geographical location is becoming irrelevant with respect to network connectivity. Furthermore, the physical devices used by individuals to communicate and conduct business are increasingly becoming transparent through machine virtualization and machine miniaturization techniques.

Virtual Desktop Infrastructure (VDI) is a new technology domain for providing users access to machines via virtualization and vendors are exploring various models of deployment opportunities. In the VDI environment, the Virtual Machines (VMs) of multiple customers can be hosted in the same data center sharing the same physical machine resources. One of the challenges in VDI deployments is to establish customer trust that the VMs that belonging to the customer are used only by intended users and that the VMs are not accidentally opened up to other users or other customers.

Another customer challenge is to determine which users can access which VMs and for how long. The VMs are dynamically instantiated on an as needed basis and the Internet Protocol (IP) addresses of these VMs changes every time they get instantiated. This poses a challenge, to configure and enforce a role-based policy on a VM whose IP Address is dynamically established at the run time.

SUMMARY

In various embodiments, techniques for secure access to virtual environments are presented. More specifically, and in an embodiment, a method for secure access to a virtual environment is provided. A virtual machine (VM) request is received from a portal. A VM is instantiated to be accessed at a dynamically created Internet Protocol (IP) address and at a dynamically created communication port number. Next, a secure token is acquired for a communication session to the VM. Finally, the IP address, the port number, and the secure token are returned back to the portal for the portal to communicate to an identity service. The identity service dynamically generates policy to be enforced during the communication session. The identity service also provides the IP address, the port number, and the secure token to an authenticated principal for use during the communication session with the VM, and the identity service provides the policy to a secure socket layer virtual private network (SSL VPN) server for the SSL VPN server to enforce the policy when the principal initiates the communication session with the VM via a SSL VPN connection through the SSL VPN.

DETAILED DESCRIPTION

Figure 1:
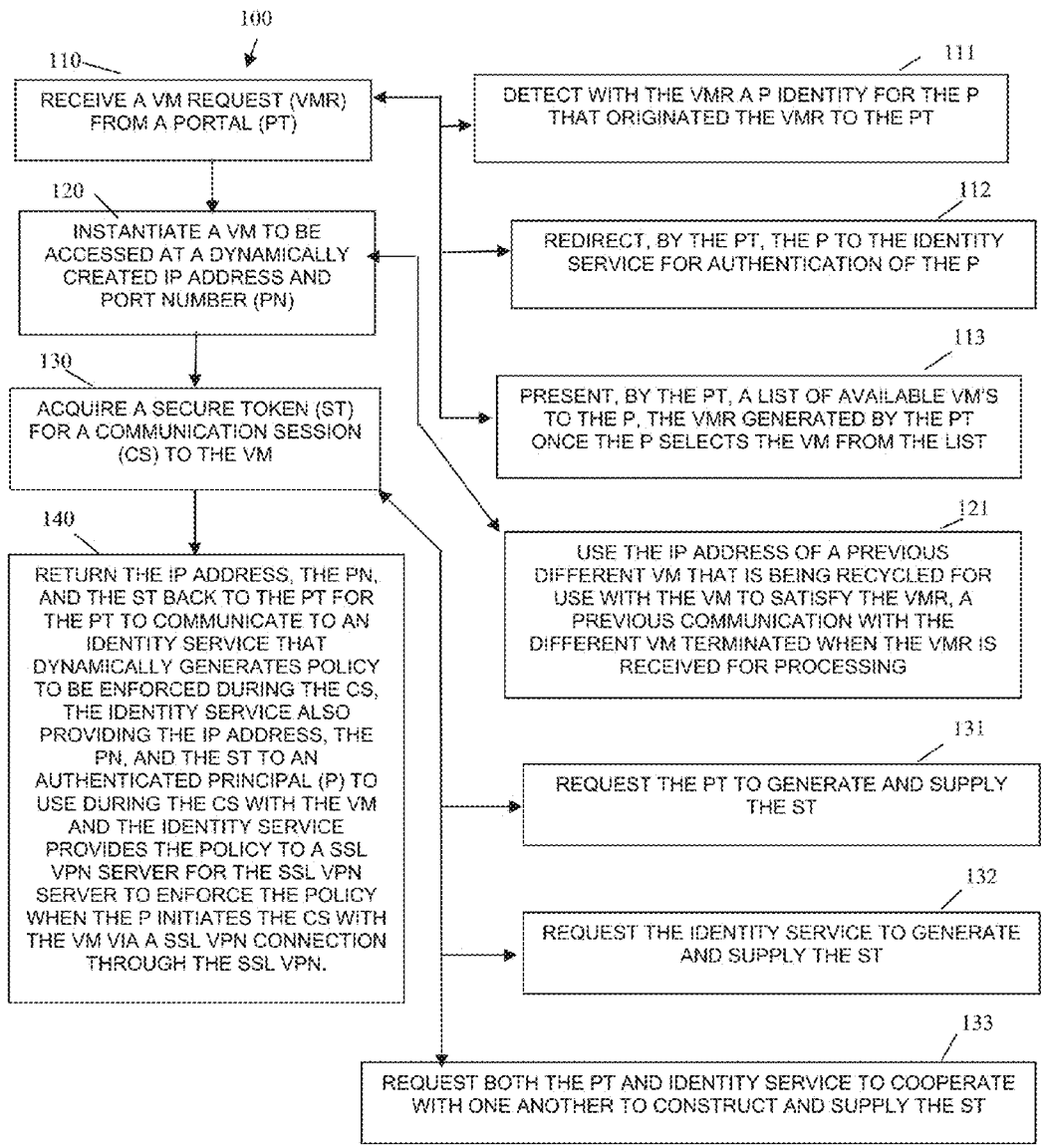
FIG. 1 is a diagram of a method for secure access to a virtual environment, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "virtual machine" (VM) may be viewed as a logical processing environment overlaid or superimposed on a physical device. The VM is a logical machine that is independent of its physical process environment or physical machine. It may include its own operating system (OS), its own file system (FS), its own directory services, etc., which may each be different from the physical processing environment.

The phrases a "virtual environment" and "virtual desktop infrastructure (VDI)" may be used interchangeably and synonymously with VM.

A "virtual image" is a specific instance of a VM, VDI, and/or virtual environment. That is, the virtual image is the configuration data that when processed becomes an executing instance of a VM. The virtual image creates or instantiates a specific VM.

Various embodiments of this invention can be implemented in existing network architectures. For example, in some embodiments, the techniques presented herein are implemented in whole or in part in the Novell® operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

FIG. 1 is a diagram of a method 100 for secure access to a virtual environment, according to an example embodiment. The method 100 (hereinafter "cloud service") is implemented in a machine-accessible and non-transitory computer-readable medium and instructions that execute on one or more processors (machines, computers, processors, etc.). The machine is specifically configured to process the VM disk personalization service. Furthermore, the cloud service is operational over and processes within a network. The network may be wired, wireless, or a combination of wired and wireless.

According to an embodiment, the cloud service is provided from the perspective of a cloud provider. The cloud provider instantiates VMs on demand by providing the user a virtual desktop infrastructure (VDI). The cloud service executes on a server or processor of the network associated with the cloud provider. In some instances, the cloud service is provided from the perspective of both the cloud provider and a portal accessed by a principal in the manners discussed herein and below.

At 110, the cloud service receives a VM request from a portal server. The portal server is a service provider that a principal, such as a user or an automated application contacts to acquire a VDI or an instance of a VM. The VDI or VM services are provided by a cloud provider via a cloud server. The portal is authenticated to and uses secure communications with an identity provider (identity service or identity server). For that matter, the cloud service, the portal server, and a SSL VPN server are all in trusted communications with one another. Trusted means that each of the entities are authenticated to the remaining entities and that secure communications are used to communicate between the entities. Such secure communications can include encrypted communications and/or secure protocols, such as but not limited to Hyper Text Transfer Protocol (HTTP) over SSL referred to as HTTPS.

According to an embodiment, at 111, the cloud service detects in the VM request a principal identity for the principal that interacts with the portal. Again, the principal originated the VM request by contacting the portal.

In an embodiment at 112, the principal is redirected by the portal to an identity service or identity provider. The identity service provides identity-based authentication and security services, such as policy distribution, perhaps token generation and management, and other security services.

In another case, at 113, the portal presents to the principal a list of available VM's to the principal once the principal is authenticated. The generation of the list can be based on policy and/or the identity of the principal, such that just those allowable VM's are provided in the list to the principal and no additional authentication by the portal is required for the VM's included in the list. Also, at 113, the VM request is generated by the cloud service once the principal affirmative selects the VM from the presented list.

At 120, the cloud service instantiates an instance of a VM. The VM is to be accessed at a dynamically created IP address and communication port number combination. Examples of this are provided below with the discussion of the FIG. 4.

In an embodiment, at 121, the cloud service uses the IP address of a previous and different VM instance. So, the IP address is being recycled for use with the VM to satisfy the VM request. A previous communication session with the different VM is terminated when the VMR is received for processing. So, unlike conventional approaches where static or reserved IP addresses are used for VM's and SSL VPN communication sessions, the teachings herein permit dynamic and recycled usage of IP addresses. One of ordinary skill in the art appreciates this situation as static IP addresses are expensive and inflexible.

At 130, the cloud service acquires a secure token for a communication session to the VM. The communication session is between the principal and the newly instantiated VM. The token is secure because it is a secret and/or uses encryption techniques or digital signature techniques to represent the token. The token is unique to the VM and principal and unique to the requested communication session between the VM and the principal. The secure token can be created in a variety of manners.

For example, at 131, the cloud service requests that the portal generate and supply the secure token for the cloud service to use.

In another case, at 132, the cloud service requests that the identity service generate and supply the secure token for the cloud service to use.

In still another situation, at 133, the cloud service requests that both the portal and the identity service cooperate with one another to construct and supply the secure token.

It is also noted, that the cloud service can generate the secure token without or in cooperation with the identity service and/or the portal. So, any single entity (cloud service, portal, or identity service) can generate the secure token or any combination of the entities can collectively generate pieces of the secure token such that the collective pieces form the secure token. Additionally, in some cases, when the VM is instantiated, services that execute on start up of the VM can generate the secure token.

At 140, the cloud service returns the IP address, the port number, and the secure token back to the portal for the portal to communicate to an identity service. It may also be the case that the cloud service communicates the secure token directly to the identity service and bypasses the portal. The identity service uses the information (including secure token) to dynamically assemble policy or policies.

The policies are to be enforced during the communication session between the principal and the VM. The identity service also supplies the IP address, the port number and the secure token to the principal once the principal is authenticated by the identity service.

The IP address, the port number and the secure token to be used by the principal to establish the secure communication session with the VM. Also, the identity service provides the policies to a SSL VPN server to enforce the policies when the principal initiates the communication session with the VM via a SSL VPN connection (achieved via a client-side SSL VPN client of the principal and the SSL VPN server).

Figure 2:
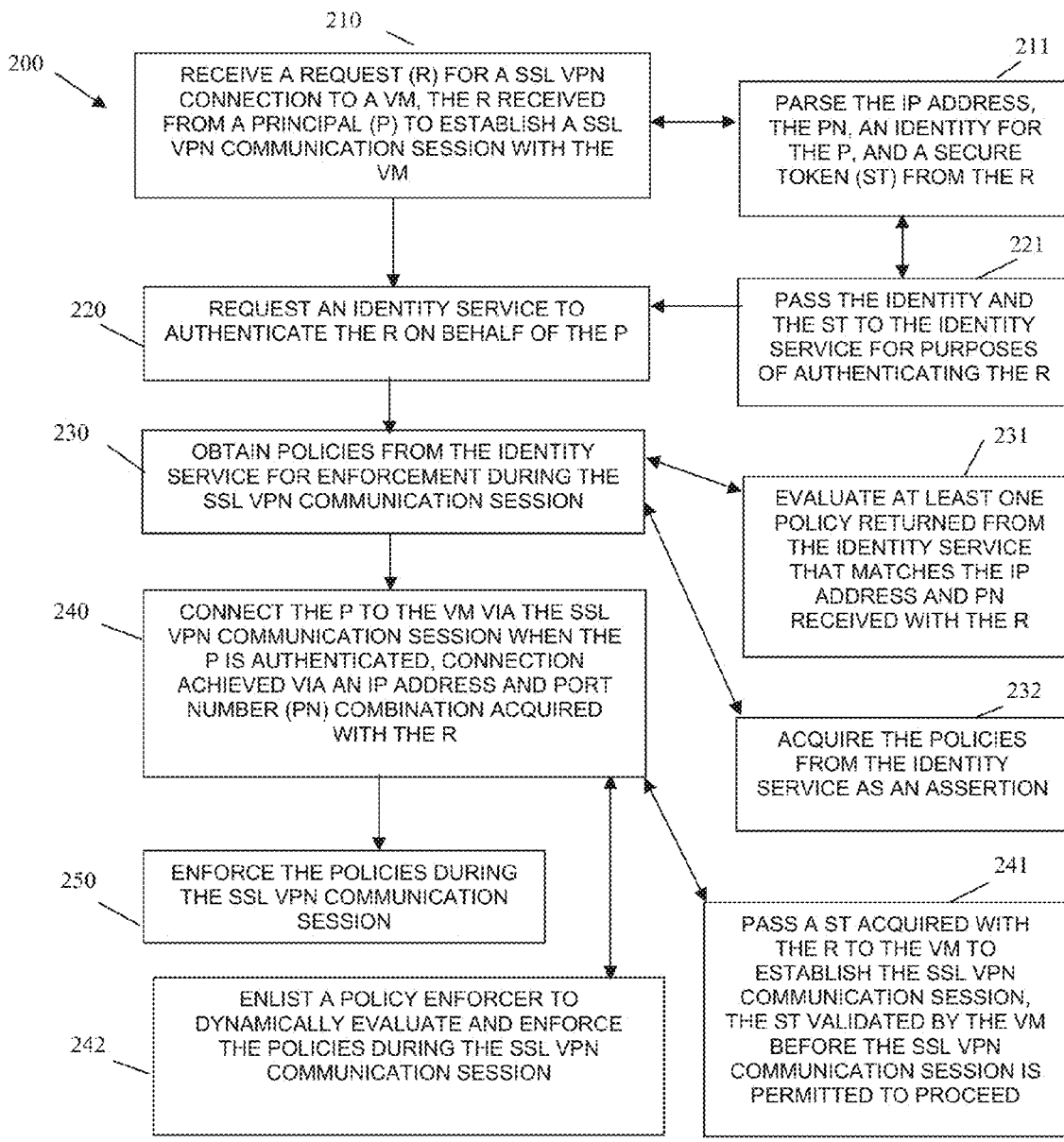
FIG. 2 is a diagram of another method for secure access to a virtual environment, according to an example embodiment.

FIG. 2 is a diagram of another method 200 for secure access to a virtual environment, according to an example embodiment. The method 200 (hereinafter "SSL VPN service") is implemented in a machine-accessible and a non-transitory computer-readable storage medium as instructions that execute on one or more processors of a network. The network may be wired, wireless, or a combination of wired and wireless. Furthermore, the processor (device having a processing instance of the SSL VPN service) is specifically configured to process the SSL VPN service.

SSL VPN service represents another aspect of the cloud service, represented by the method 100 of the FIG. 1. Specifically, the cloud service of the method 100 provides processing that occurs within a cloud provider (and in some cases a portal) that defines and initiates an instance of a VM, whereas the SSL VPN service represents processing of a SSL VPN server that interacts with the cloud server and portal to achieve secure access to a virtual environment on behalf of a principal. That is, the SSL VPN service processes external to a cloud and the VDI provided by the cloud. The method 100 and the method 200 cooperate and interact with one another to provide secure access management to virtual environments or VM's dynamically instantiated by the cloud service (represented by the method 100 of the FIG. 1).

It is also noted that a more complete set of interactions between the SSL VPN service and the cloud service along with other entities are provided in the example illustration below for the FIG. 4.

At 210, the SSL VPN service receives a request for a SSL VPN connection to a VM. The request is received from a principal via a client device of the principal and the request is sent to establish a SSL VPN communication session between the principal and the VM.

According to an embodiment, at 211, the SSL VPN service parses the IP address, the port number, an identity for the principal, and a secure token from the request.

At 220, the SSL VPN service requests an identity service to authenticate the request on behalf of the principal. That is, the SSL VPN service enlists the identity service for authentication and security services.

In an embodiment, at 221 and continuing with the embodiment at 211, the SSL VPN service passes the identity and the secure token to the identity service for the identity service to authenticate the request.

At 230, the SSL VPN service obtains policies from the identity service. The policies are dynamically assembled or federated by the identity service and the policies are enforced during the SSL VPN communication session between the principal and the VM.

In an embodiment, at 231, the SSL VPN service evaluates at least one policy returned from the identity service to ensure that the IP address and port number included with the request matches what is defined in that policy acquired from the identity service. So, only the IP address and the port number authorized to access the VM can be used by the principal during the SSL VPN communication session.

In another situation, at 232, the SSL VPN service acquires the policies from the identity service as an assertion. An example set of information in the assertion is provided below with reference to the discussion associated with the FIG. 4.

In one scenario, at 233, the SSL VPN service passes the secure token acquired with the request to the VM to initially establish the SSL VPN communication session. The secure token is cross checked and validated by the VM before the SSL VPN communication session is permitted to proceed.

At 240, the SSL VPN service connects the principal and the VM via the SSL VPN communication session when the principal is authenticated. The connection to the session is achieved via the IP address and port number combination acquired with the initial request.

According to an embodiment, at 241, the SSL VPN service passes a secure token with the request to the VM for purposes of establishing the SSL VPN communication session. The secure token is validated by the VM before the SSL VPN communication session is permitted to proceed.

At 242, the SSL VPN service enlists a policy enforcer (third party service) to dynamically evaluate and to dynamically enforce the policies during the SSL VPN communication session.

At 250, the SSL VPN service enforces the policies during the SSL VPN communication session.

So, one now appreciates how secure access to a virtual environment (VM) can be achieved via a dynamically generated IP address and port number that is authenticated via a secure token.

Figure 3:
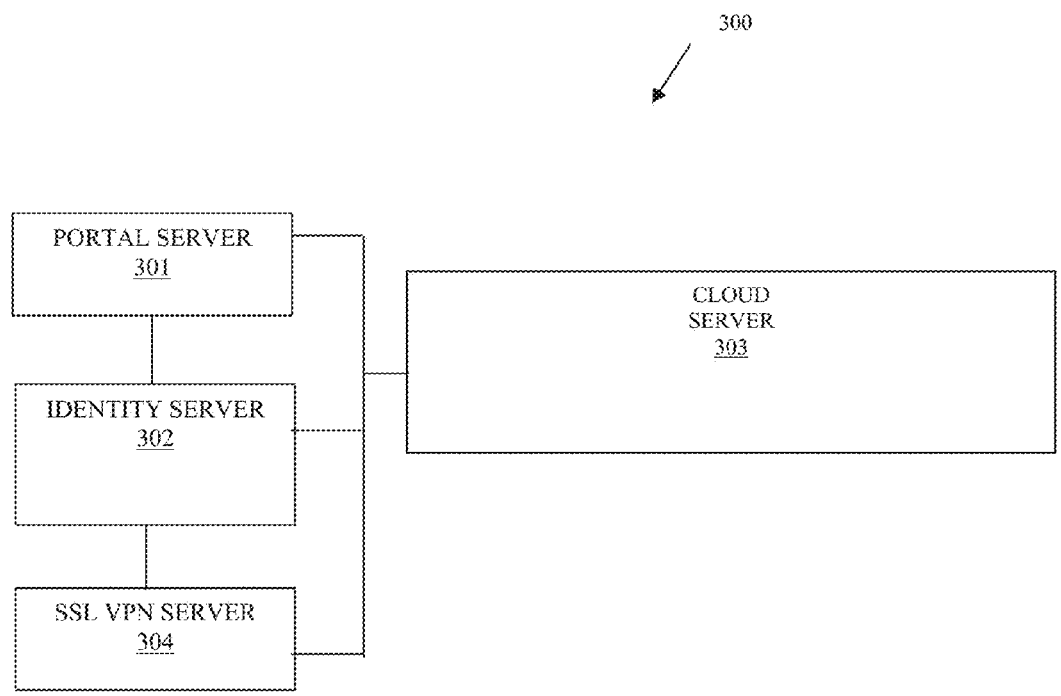
FIG. 3 is a diagram of a secure access management system, according to an example embodiment.

FIG. 3 is a diagram of a secure access management system 300, according to an example embodiment. The secure access management system 300 is implemented in a machine-accessible and a non-transitory computer-readable storage medium as instructions that execute on multiple processors (multiprocessor) and that is operational over a network. The processors are specifically configured to process the components of the dynamic secure access management system 300. Moreover, the network may be wired, wireless, or a combination of wired and wireless. In an embodiment, the secure access management system 300 implements, inter alia, certain aspects of the methods 100 and 200 represented by the FIGS. 1 and 2, respectively.

The secure access management system 300 includes a portal server 301, an identity server 302, a cloud server 303, and an SSL VPN server 304. Each of these components and their interactions with one another will now be discussed in turn.

The portal server 301 is a processing device having instructions residing in a non-transitory computer-readable medium. The processing device configured to execute the instructions to provide the features of the portal server 301. Example processing associated with the portal server 301 was presented in detail above with reference to the methods 100 and 200 of the FIGS. 1 and 2, respectively.

The portal server 301 is configured to facilitate authentication of a principal via the identity server 302 for access to a specific instance of a VM. The principal (such as a user or an automated service executing on a client machine) interacts with the portal server 301 to submit a request for a SSL VPN communication session with the VM.

The identity server 301 is also a processing device having instructions residing in a non-transitory computer-readable medium. The processing device of the identity server 301 configured to execute the instructions to provide the features of the identity server 302. Aspects of the identity server 302 were provided in detail above with reference to the methods 100 and 200 of the FIGS. 1 and 2, respectively.

The identity server 301 is configured to dynamically acquire and/or assemble or federate the policies, which are provided to the SSL VPN server 304 for enforcement during the SSL VPN communication session. The policies are based on an identity for the principal.

According to an embodiment, the identity server 301 supplies the policies to the SSL VPN server 304 via an assertion and the assertion includes one or more or all of the following: a security/access role for the principal, a specified IP address of the VM, a specified port number of the VM, a time interval for allowing the SSL VPN session between the principal and the VM, an action for the SSL VPN server 304 to take on successful evaluation of the policies, and another action for the SSL VPN server 304 to take on unsuccessful evaluation of the policies.

The cloud server 303 is also one or more processing devices having instructions residing in a non-transitory computer-readable medium. The processing devices of the cloud server 303 are configured to execute the instructions to provide the features of the cloud server 303. Aspects of the cloud server 303 were provided in detail above with reference to the methods 100 and 200 of the FIGS. 1 and 2, respectively; and more particular with reference to the method 100 of the FIG. 1.

The cloud server 303 is configured to dynamically instantiate the VM at a specified IP address and port number. The cloud server 303 is also configured to provide access to the VM during the SSL VPN session when a secure token is presented that the cloud server 303 validates on its own or in cooperation with the identity server 302.

The SSL VPN server 304 is also one or more processing devices having instructions residing in a non-transitory computer-readable medium. The processing devices of the SSL VPN server 304 are configured to execute the instructions to provide the features of the SSL VPN server 304. Aspects of the SSL VPN server 304 were provided in detail above with reference to the methods 100 and 200 of the FIGS. 1 and 2, respectively; and more particular with reference to the method 200 of the FIG. 2.

The SSL VPN server 304 is configured to interact with the identity server 302, the principal, and the cloud server 303 for purposes of authenticating the principal and to establish the SSL VPN session at the specified IP address and port number using the secure token.

The SSL VPN server 304 also configured to enforce the dynamically provided policies received from the identity server 302.

In an embodiment, the SSL VPN server 304 is also configured to terminate the SSL VPN session when one of the policies are violated during the SSL VPN session.

Figure 4:
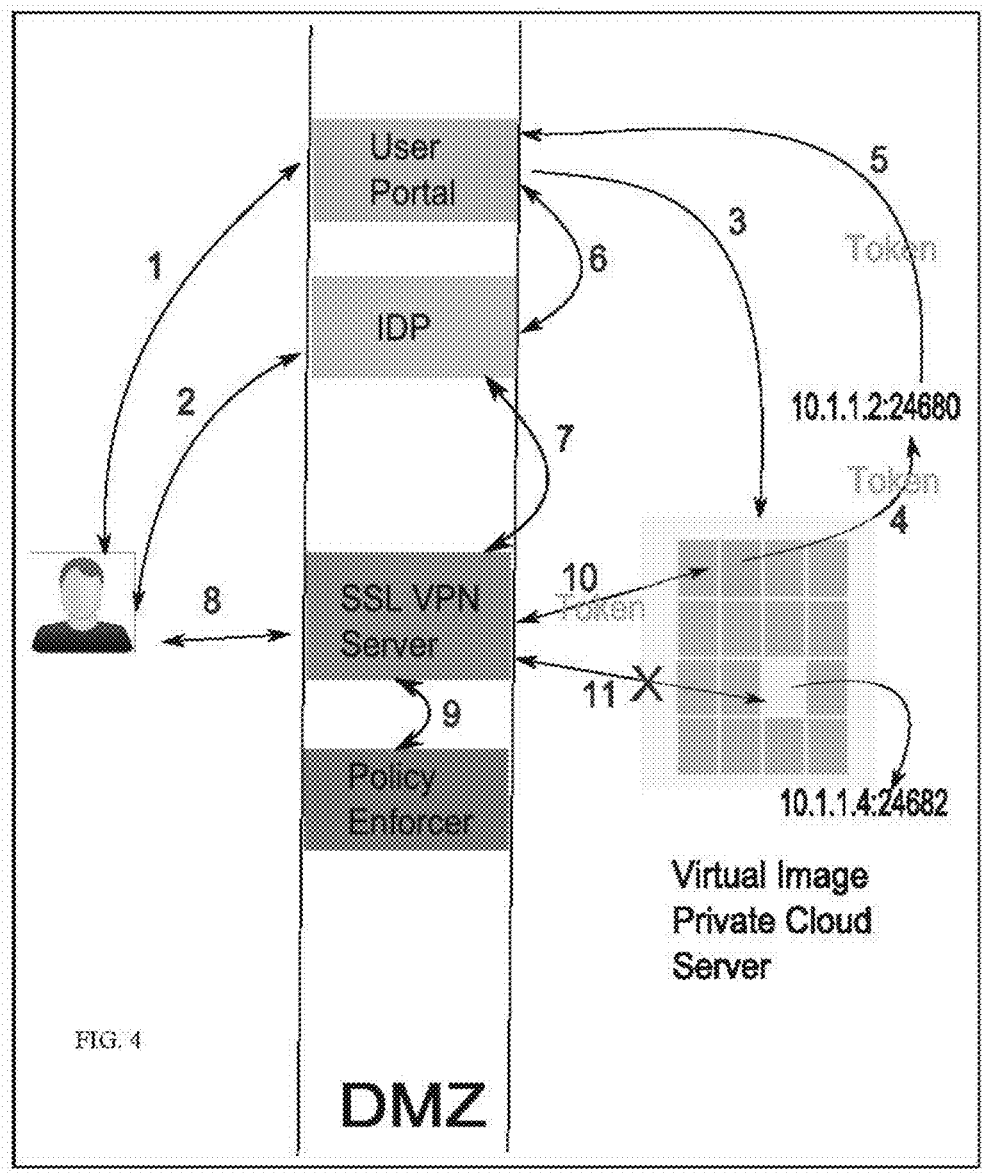
FIG. 4 depicts a flow diagram of various components of a secure access management system for virtual environments, according to an example embodiment.

FIG. 4 depicts a flow diagram of various components of a secure access management system for virtual environments, according to an example embodiment. The flow diagram is presented for purposes of illustration as other components or fewer components can be used without departing from the teachings presented herein.

The processing of the components are achieved on processors of a network that are specifically configured to execute instructions that reside in a non-transitory computer-readable medium.

Initially, some definitions are provided that assist in comprehending the FIG. 4.

User: An end user who belongs to an organization whose virtual images are hosted on a private cloud server. The user has been granted some access privileges to some specific virtual images at specific times. A user is asked to authenticate at the User Portal. After authentication, he/she is presented with a list of virtual images he/she can access. After the selection, the user is allowed access to the virtual image, which is protected by the SSL VPN server.

User Portal: The portal provides a list of VMs that the user is eligible to access. The user portal generates a request to the Cloud Server to instantiate the VMs and expects the details of the VMs.

IDP: Authentication provider or identity service/identity provider (IDP). The IDP is capable of authenticating the users; this may be done by name and password combination, advanced authentication methods or partner services by means of federation protocols. The IDP is the role generator. The IDP also applies the VM information it receives from User Portal and applies it on a partial policy to make it a meaningful policy.

SSL VPN Server: The central server, which provides the access to the VM and enforces the policies every time an access is made to the VM by the user.

Policy Enforcer: A policy evaluator. Takes the required input and evaluates the policy and responds with a result.

Virtual Image Private Cloud Server: The central server for hosting virtual images. It instantiates the VMs on an as-needed basis. After instantiating the VM image, the cloud server presents its IP Address, Port, and a secure Token from the VM. This token lives for a particular period of time and access to the VM image requires the token.

Now the FIG. 4 is discussed from the perspective of a sample transaction occurring with a user to instantiate a virtual environment (VM or VDI) in a secure and dynamic manner.

A user accesses the Portal Server (1). Since the user is not authenticated, redirection occurs to the IDP for authentication (2).

If not already authenticated at the IDP, the user is asked to provide credentials. This step may involve multiple redirections and includes the possibility of going to a third party IDP for authentication. After authenticating at IDP, the user is redirected back to the Portal Server. The user is then presented with a list of VMs that he/she is eligible to access.

The Portal Server provides the authenticated user with a page listing available VMs for selection (1). Upon VM selection, the Portal Server initiates a VM-SPAWN request to the Cloud Server (3).

The cloud server instantiates the requested VM and associates an IP Address and port combination at which the newly instantiated VM can be accessed (4). The Portal Server also associates a unique secure token to this VM, which may be generated by the Portal Server, the User Portal or the IDP.

The IP Address, Port and Secure Token details are returned to the User Portal (5).

The Portal Server provides the information to the IDP (6). The IDP uses the provided information along with policy definitions to dynamically generate access policies for the user.

After choosing the VM, the SSL VPN client agent is directed to a Uniform Resource Locator (URL) link at the SSL VPN server with the VM instance location. An example of the URL is:

https://vdi.mycompany.com/accessVM?Address=10.1.1.2:24680

Authenticated access to the SSL VPN is provided via the IDP (8). An authentication request is sent to the IDP (7). Since the User is already authenticated at the IDP, an assertion is returned that propagates the dynamically generated policy information to the SSL VPN (7). An example of this information might include:

ROLE=employee, restricted-users
VDI_IP=10.1.1.2
VDI_PORT=24680
TIME INTERVAL=3.30 PM and 5.30 PM local time
ACTION ON SUCCESS=Allow access request.
ACTION ON FAILURE=Deny the access, generate an audit event The SSL VPN server enforces the policies (9). These policies are dynamic and allow the IP address and the Port number that the cloud server returned to be used by the user. The SSL VPN uses dynamic policy to control access to a single VM instance based on identity data provided by the IDP.

On successful evaluation of policies, the SSLVPN server connects to the cloud server (10). In addition, the SSL-VPN may also append the secure token received from the IDP (7) to the request as it connects to the cloud server. The cloud server evaluates the secure token and responds to the request appropriately. The Portal, IDP, SSL VPN combination results in a secure token generated by the cloud server at instantiation time; the secure token is returned to the cloud server at session connect time. This provides an additional level of client security.

It is shown in the FIG. 4 at (11) that an access request to a VM 10.1.1.4 is not possible by the above user because of the policy enforcement at the SSL-VPN and the unavailability of secure token to that VM.

The techniques presented herein and above provide for a variety of novel benefits over the existing approaches used in the industry. Specifically, the techniques provide for:

The technique of injecting role based dynamic access policies in a VDI system.

The technique, in which role based authorization policies can be configured, generated and enforced in a VDI environment.

The technique in which the role based policies are not tied to the IP Address assigned to the virtual image, but instead the dynamically assigned IP address and port information fulfills the meaning of the policy at run time.

The technique in which the role based policies can be created partially and the real policies are generated at run time when the user attempts to access the virtual desktop.

The technique of tying the secure token with a VM and having the VM evaluating the secure token before granting access.

The technique of using the secure token via the user session without having the token pass though the client.

The technique of allowing either the User Portal, IDP or Cloud Server to generate a token at instantiation time and receive it back at run time to validate the user.

The token at the VM automatically expires after a configured period of idleness. Once the token expires, because of its lifetime expiration or because of idleness, the VM shuts down automatically, thus relinquishing the valuable resources to the other VMs.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
assembling a token from multiple portions of information, each portion provided by a separate entity;
providing the token to a principal for use in a dynamically created communication session with a Virtual Machine (VM), the token identifying access policies for enforcement during the communication session; and
enforcing the access policies during; the communication session between the principal and the VM based on the token.

2. The method of claim 1, wherein assembling further includes obtaining the multiple portions from an identity service, a portal, and a cloud service representing the separate entities.

3. The of claim 2, wherein obtaining further includes assigning the token to be unique to the VM.

4. The method of claim 1, wherein assembling further includes initiates assembling of the token in response to a request issued from the principal to communicate with the VM.

5. The method of claim 4, wherein assembling further includes receiving, by a portal, the request.

6. The method of claim 4, wherein receiving further includes dynamically instantiating an instance of the VM in response to the request.

7. The method of claim 6, wherein dynamically instantiating further includes dynamically assigning a newly created Internet Protocol (IP) address for the instance of the VM.

8. The method of claim 7, wherein dynamically assigning further includes restricting access to the communication for access to the VM to communications directed to a unique combination that includes the IP address and a communication port.

9. The method of claim 1, wherein providing further includes assigning the token to be unique to the communication session, the principal, and the VM.

10. The method of claim 1 further comprising, providing a newly created Internet Protocol (IP) address and a communication port for accessing the VM to the principal, and restricting access to the communication session unless the principal provides the token, the IP address and an identifier for the communication port.

11. A method, comprising:
receiving a request over a network connection for a secure communication session with a Virtual Machine (VM), wherein receiving further includes identifying the request as having originated from a principal;
assembling a secure token from multiple entities over the network connection;
assigning the secure token to access rights for enforcement against the principal during the secure communication session;
providing the secure token to the principal along with access information to access the secure communication session;
acquiring the access rights based on presentation by the principal of the secure token; and
enforcing the access rights against the communications during the secure communication session based on the secure token.

12. The method of claim 11, wherein assembling further includes dynamically creating an instance of the VM at a newly established Internet Protocol (IP) address.

13. The method of claim 12, wherein dynamically creating further includes configuring the instance for operation over just a predefined communication port.

14. The method of claim 13, wherein providing further includes providing the access information as the IP address and the predefined communication port.

15. The method of claim 14 further comprising, authenticating the principal for access to the secure communication session when the principal presents the secure token, the IP address, and the predefined communication port with communications directed to the secure communication session.

16. A system, comprising:
a cloud server including at least one processor and memory;

wherein the cloud server is configured to: i) dynamically instantiate a Virtual Machine (VM), ii) dynamically configure access to the VM over a predefined communication port, iii) authenticate access to a communication session with the VM based on validation of a secure token constructed from multiple entities, and iv) enforce policies during any authenticated access to the communication session, the policies identified in response to receipt and identification of the secure token.

17. The system of claim 16, wherein the cloud server is further configured to v) track and audit communications during the communication session.

* * * * *

UNITED STATES PATENT AND TRADEMARK OFFICE
CERTIFICATE OF CORRECTION

PATENT NO.       : 9,787,659 B2
APPLICATION NO.  : 14/658349
DATED            : October 10, 2017
INVENTOR(S)      : Burch et al.

Page 1 of 1

It is certified that error appears in the above-identified patent and that said Letters Patent is hereby corrected as shown below:

In the Claims

In Column 9, Line 65, in Claim 1, delete "during;" and insert --during-- therefor In Column 10, Line 5, in Claim 3, after "The", insert --method--

Signed and Sealed this
Twenty-first Day of April, 2020

Andrei Iancu
*Director of the United States Patent and Trademark Office*